United States Patent Office 2,995,496
Patented Aug. 8, 1961

2,995,496
HYDROXYLATION OF GLYCYRRHETIC ACID
Gilbert M. Shull, Huntington Station, and Donald Beck, Port Chester, N.Y., assignors to Chas. Pfizer & Co., Inc., New York, N.Y., a corporation of Delaware
No Drawing. Filed May 4, 1959, Ser. No. 810,542
10 Claims. (Cl. 195—30)

This invention relates to the microbiological transformation of triterpenoids as well as to a new and useful substance produced thereby. More particularly, the present invention is concerned with the microbiological hydroxylation of triterpenoids as well as with methods for the recovery and purification of the aforesaid novel product. The invention also includes within its scope said transformation product in dilute forms, as crude concentrates, and in pure crystalline form. This particular product is especially useful for alleviating anti-inflammatory conditions as well as for treating rheumatoid arthritis in addition to exhibiting utility as a surface-active agent.

Although the microbiological transformation of steroids has been studied extensively in the past [Trans. N.Y. Acad. Sc., Ser. II, vol. 19, No. 2, pp. 147–172 (1956)], there is no known instance reported in the prior art concerning such transformations in the triterpenoid series. As can be well understood by those skilled in the art, a process concerned with the microbiological hydroxylation of triterpenoids such as glycyrrhetic acid would be of tremendous value to the public in general and to the pharmaceutical industry in particular.

In this connection, it should be noted that glycyrrhetic acid is a pentacyclic triterpene of universal interest. It occurs in the licorice root as the disaccharide glycoside of glycyrrhizic acid, and it is one of the few triterpenens with pronounced physiological effects. Incidentally, it is also unusual from a chemical point of view in that it is the only known triterpene with an 11-oxygen function. Particularly noteworthy is the observation of Groen and co-workers [J. Clin. Invest., vol. 31, p. 87 (1952)], that glycyrrhetic acid qualitatively exhibits the same effect on the electrolyte balance in Addison's disease as does desoxycorticosterone.

Accordingly, a primary object of the present invention is to provide a process for the microbiological transformation of triterpenoids. Another and particular object of the present invention is to provide a process for the microbiological hydroxylation of triterpenoids. A further and even more particular object of this invention is to provide a process for the microbiological transformation of glycyrrhetic acid to a hydroxylated derivative thereof. Other objects and advantages of this invention will become apparent to those skilled in the art to which it pertains from the description which follows.

In accordance with the present invention, it has now been unexpectedly discovered that a new hydroxylated substance is formed during the cultivation under controlled conditions of a microorganism chosen from the group consisting of *Curvularia lunata* and *Aspergillus unguis* when said cultivation is conducted in the presence of a triterpenoid substrate. It is to be understood that for the production of the product of the present invention, this process is not necessarily limited to the aforesaid microorganisms or to microorganisms fully answering their description as they are only presented for purposes of illustration. As a matter of fact, it is especially intended to include the use of mutants produced from such microorganisms by various means, such as X-radiation, ultrasonic vibrations, nitrogen mustards, and the like. Incidentally, the microorganisms employed in the process of this invention are all extremely simple to grow and they can be easily adapted to large scale commercial operations. In the latter connection, the facility with which these organisms readily grow on very cheap media is of particular advantage. In general, the present process affords the desired hydroxylated substance in a form in which it can easily be isolated and purified.

In accordance with the process of this invention, an aqueous nutrient medium containing a triterpenoid substrate such as glycyrrhetic acid or eburicoic acid is fermented under submerged aerobic conditions by means of a microorganism chosen from the aforesaid group consisting of *Curvularia lunata* and *Aspergillus unguis* as previously mentioned. Other pentacyclic triterpenes such as icterogenin, machaeric acid, rehmannic acid, and the like may also be used as substrates in this process, as can various tetracyclic triterpenes including polyporenic acid A and polyporenic acid C. Cultures of the microorganisms employed are available in several public culture collections such as, for example, the culture collection of the U.S. Army Quartermaster Corps at Philadelphia [*Aspergillus nidulans* QM 25b now reidentified as *Aspergillus unguis* (Emile-Weil and Gandin) Emend, Thom and Raper], while others may be isolated from natural material such as the soil by standard procedures well known to mycologists [*Curvularia lunata* (Wakker) Boedijn]. It should also be realized that the yield of hydroxylated triterpenoid produced by this process will vary to some extent, depending upon the nature of the triterpenoid used as starting material as well as with the particular microorganism employed in addition to the usual reaction conditions such as time, temperature, pH, nutrient medium and the point at which the substrate is added to the fermentation medium, etc. Incidentally, various known methods may be used for the isolation and identification of the products afforded by this invention.

In carrying out the process of this invention, it has been found desirable to employ cultures which are grown in or on media favorable to their development. In this connection, it is to be noted that although solid media may be utilized, liquid media are preferred for mycelial growth under aerobic conditions; for instance, such liquid media as Brewer's wort are well adapted to use under submerged aerobic fermentation conditions. For these purposes, it is necessary that the media contain suitable sources of available carbon, nitrogen and minerals so as to facilitate substantial growth of the microorganism under optimum conditions. Available carbon may be obtained from such sources as corn meal, proteins, amino acids, carbohydrates, starches, dextrin, molasses and sugars, including glucose, fructose, mannose, galactose, maltose, sucrose, lactose, various pentoses and cerelose, while carbon dioxide, glycerol, alcohols, acetic acid, sodium acetate, etc., are illustrative of other materials which provide assimilable carbon for the energy requirements of these microorganisms; in this regard, mixtures of various carbon sources are sometimes employed to advantage. Nitrogen may be provided in assimilable form from such suitable sources as soluble or insoluble animal and vegetable proteins, soybean meal, peanut meal, wheat gluten, cottonseed meal, lactalbumin, casein, egg albumin, peptones, polypeptides or amino acids, urea, ammonium salts and sodium or potassium nitrate; furthermore, whey, distiller's solubles, corn steep liquor and yeast extract have also been found to be useful. Among the mineral constituents which the media may contain, either naturally present or added, are available calcium, magnesium, potassium and sodium, as well as trace amounts of chromium, cobalt, copper, iron and zinc; sulfur may be provided by means of sulfates, free sulfur, hyposulfite, persulfate, thiosulfate, methionine, cysteine, cystine, thiamine and biotin, while phosphorus can be provided from such sources as ortho-, meta-, or pyrophosphates, salts or esters thereof, glycerophosphate, corn steep liquor and casein. Incidentally, if excessive foaming is encountered during the fermentation step, antifoaming agents such as vegetable oils may be added to the fermentation medium. In addition, suspending or mycelial carriers, such as filter earths, filter aids, finely divided cellulose, woodchips, bentonite, calcium carbonate, magnesium carbonate, charcoal, activated carbon or other suspendable solid matter, methylcellulose or carboxymethylcellulose, alginates, and the like, may be added to facilitate such unit processes and operations as fermentation, aeration and filtration.

In accordance with a more specific embodiment of the process of this invention, the cultivation of microorganisms selected from the aforementioned group species is generally conducted in aqueous nutrient media at a temperature that is in the range of from about 20° C. to about 35° C. under submerged conditions of aeration and agitation, although the preferred temperature range is 24-30° C. The fermentation is generally continued until substantial growth is achieved and a period of about one to about four days is usually sufficient for such purposes. The pH of the fermentation medium tends to remain rather constant, generally being in the range of from about pH 5.5 to about pH 8.0 and in most cases it remains in the pH range of 6–7; however, in order to prevent variations that may occur in this regard as well as to maintain the pH of the medium in the preferred range of pH 6.4–6.8, buffering agents such as calcium carbonate may be added to the medium.

In connection with the fermentation step, it is to be noted that inoculum for the microbiological transformation of triterpenoids by the growth of the aforementioned microorganisms may be obtained by employing culture slants propagated on media such as beef lactose, potato-dextrose agar or Emerson's agar. The growth may be used to inoculate either shaken flasks or inoculum tanks for submerged growth or alternatively, the inoculum tanks may be seeded from the shaken flasks. The growth of the microorganism usually reaches a maximum in about two or three days, although variations in the equipment used as well as in the rates of agitation and aeration, and so forth, may affect the speed at which maximum growth is achieved. In particular, the growth rate during the fermentation stage is especially dependent upon the degree of aeration employed, the latter being effected by either surface culture aerobic fermentation conditions or, and preferably, by submerged aerobic conditions as aforesaid. The latter is usually accomplished by blowing air through the fermentation medium which is simultaneously subjected to constant agitation. In general, a desirable rate of aeration for the medium is one that is maintained in the range of from about one-half to about two volumes of free air per volume of broth per minute, although resort may be had to such modifications as the use of subatmospheric or superatmospheric pressure; for instance, pressures of 10 lbs./sq. in. and 30 lbs./sq. in., respectively, may be employed. Incidentally, constant agitation may be maintained by the use of suitable types of agitators generally familiar to those in the fermentation industry. Needless to say, aseptic conditions are best maintained throughout the transfer of the inoculum and throughout the period of growth of the microorganism.

The triterpenoid compound as a solid, or in a solution or suspension with a suitable solvent such as acetone or ethanol, is added to the cultivated microorganism under aseptic conditions, and the mixture is agitated and aerated in order to bring about the growth of the microorganism and transformation of the triterpenoid substrate. The triterpenoid may either be added when the medium is seeded with a culture of the desired microorganism or after growth of the selected organism has been established in the nutrient medium under aerobic conditions. In some instances, it may be found more advisable to follow the latter procedure, particularly if there is a tendency to produce undesired by-products from the triterpenoid substrate during the initial stages of growth of the microorganism. Another method which is most useful is one in which the microorganism is grown on a suitable nutrient medium under aerobic conditions in the absence of a triterpenoid; the mycelial growth may then be filtered from the broth, washed with distilled water and subsequently added to an aqueous suspension of the triterpenoid substrate followed by agitation and aeration of the mixture for about 12 to about 48 hours, after which time the product of the reaction is isolated. This process has the advantage of ease of recovery of the transformation product, since the various nutrient materials originally used to aid the growth of the microorganism are now absent as are the various materials excreted by the growing organism during the initial stage of growth. Moreover, still other methods such as those familiar to enzyme chemists may also be utilized for conducting the present microbiological transformation process. In all these procedures, it should be kept in mind that the degree of transformation may vary depending on whether the whole fermentation broth or only the isolated washed mycelium is used.

In accordance with an alternative method of growth in connection with the fermentation step, enzyme preparations obtained by the growth of a suitable microorganism selected from the aforementioned species group may be used for conducting the process of this invention. These may be prepared by a variety of methods from the cells of the chosen organisms, employing several different techniques to release the oxidizing enzymes from the cells. Such techniques are familar to those skilled in the art and they include grinding, particularly with abrasive materials such as powdered glass or sand; autolysis, which involves heating an aqueous suspension of the cells under a layer of toluene at a temperature in the range of from about 20° C. to about 35° C. for several days; freeze-drying, which is concerned with the rapid freezing and thawing of the cellular material; ultrasonic vibrations, wherein such energy is employed to rupture the cells; and extraction of the cells with a water-miscible solvent such as acetone. The enzyme preparations so obtained may be used for the transformation of the triterpenoids in media similar to those used with the grown cells, i.e., a medium containing a hydrogen acceptor such as fumarate, a buffer and, in some cases, a bivalent metal, particularly magnesium, together with a minor proportion of adenosine triphosphate. The cell-free enzymes of the microorganisms employed in the process of this invention may be used in such media as previously discussed at a temperature in the range of from about 20° C. to about 40° C. In general, the transformation of the triterpenoid substrate is effected in a period of from a few hours to several days. Detailed descriptions of suitable media for both the isolated-resuspended cells and the cell-free elaboration products are given in standard textbooks [e.g., see "Manometric Technique in Tissue Metabolism," by W. W. Umbriet et al., Burgess Publishing Company, Minneapolis (1949), and "Respiratory Enzymes," by H. Lardy, Burgess Publishing Company, Minneapolis (1949)].

In general, a concentration of from about 0.01% to about 0.5% by weight of the total weight of the triterpenoid substrate (for instance, glycyrrhetic acid) is used in conducting this process, although it is possible that other concentrations may sometimes be found to be more favorable. Inasmuch as the solubility of the starting material is rather limited in water, an excess of the starting material may only be slowly converted to the transformation product. However, the state of subdivision of the triterpenoid when added to a growing microorganism or enzyme system does not appear to greatly affect the yield or the nature of the products formed under otherwise identical conditions. For instance, when a water-miscible solvent solution of the triterpenoid is added to the aqueous fermentation system, the triterpenoid is generally precipitated in a finely divided form in the presence of a large excess of water; it was found that this did not appreciably improve the rate of transformation as compared with the method involving the direct addition of the triterpenoid in anhydrous crystalline form.

After completion of the microbiological transformation step, the product is easily recovered from the mixture by means of extraction with a suitable water-immiscible solvent and preferably with a chlorinated lower hydrocarbon providing the pH of the medium is at least below about pH 6.0; preferred chlorinated lower hydrocarbons include methylene chloride, chloroform, ethylene dichloride, trichloroethane, and the like, chloroform being particularly advantageous in this respect. The extract containing the product and unreacted starting material is then concentrated in vacuo either to a small volume or else to dryness so as to obtain a solid material. Purification of this material can be accomplished in several ways, the most effective method involving the use of chromatography by means of which the product is separated from unreacted starting material and from by-products of unknown structure that may be formed during the transformation. Such chromatographic techniques are readily available and their existence is well known to those skilled in this art [e.g., see A. Zaffaroni et al., Science, vol. 111, p. 6 (1950); R. B. Burton et al., J. Biol. Chem., vol. 188, p. 763 (1951); and I. E. Bush, Biochem. J., vol. 50, p. 370 (1952)].

Accordingly, upon separation of the reaction products by column chromatography, it is possible to combine the so-identified desired eluate fractions and to concentrate same to a small volume. The product may then be crystallized and the crude crystalline material purified by redissolving it in the chlorinated lower hydrocarbon followed by extraction of the resulting solution with a dilute aqueous basic solution, such as 5% aqueous sodium bicarbonate, whereby the impurities remain dissolved in the chlorinated hydrocarbon layer; subsequent readjustment of the pH of the aqueous extract to a value that is at least below pH 6.0, followed by re-extraction with a water-immiscible solvent such as chloroform and isolation of the product in the usual manner is then carried out. Further purification can then be achieved by means of re-crystallization from a suitable solvent such as ethyl acetate or acetone.

The hydroxylated derivative of glycyrrhetic acid of this invention is a white crystalline material which melts with decomposition at 299–307° C. It is moderately soluble in glacial acetic acid, methanol, ethanol, methylene chloride, chloroform, ethylene dichloride, acetone, dioxane, ethyl acetate and pyridine, but only slightly soluble in dilute aqueous alkali and dilute aqueous bicarbonate and practically insoluble in water and petroleum ether. This novel substance exhibits a scanner-position spot and it contains the elements carbon, hydrogen and oxygen in approximately the following proportions by weight specified:

Carbon _____ 74
Hydrogen _____ 10
Oxygen (by difference) _____ 16

When the compound of this invention is dissolved in ethanol, it exhibits a peak of maximum absorption in the ultraviolet region of the spectrum at 247–248 m$\mu$; and when dissolved in dioxane (C., 1%), its optical rotation is $[\alpha]_D^{25}$ +75°±1, and in pyridine (C., 1%), it is $[\alpha]_D^{25}$ +140°.

As previously mentioned, the hydroxylated derivative of glycyrrhetic acid of this invention is readily adapted to therapeutic use as an anti-inflammatory agent as well as for the treatment of rheumatoid arthritis. Furthermore, the toxicity of this compound has been found to be quite low, as aforesaid, when orally administered to mice in amounts sufficient to achieve the desired results. The activity of this particular compound is substantially superior to that of the parent compound in addition to having the further advantage of being somewhat more soluble in water and polar organic solvents, thereby rendering it useful as a surface-active agent.

In accordance with a method of treatment of the present invention, the aforementioned therapeutically active compound can be given to the afflicted subject via the oral or parenteral routes as previously indicated. In general, this compound is most satisfactorily administered in the range of from about 7.5 mg. to about 750 mg. per day in the order of about one to about five doses, although variations will necessarily occur depending upon the weight of the subject being treated. However, a dosage level in the range of from about 0.1 mg. to about 10 mg. per kg. of body weight per day is most desirably employed in order to achieve effective results. Nevertheless, it is to be appreciated that variations may also occur in this respect, depending upon the species of animal being treated and its individual response to said therapeutic agent, as well as on the particular route of administration chosen and the time period and interval at which such administration is carried out. In some instances, doses below the lower limit of the aforesaid range may be more than adequate, while in other cases still larger dosages may be administered without causing any harmful side effects.

In connection with the use of the hydroxylated derivative of glycyrrhetic acid in the treatment of anti-inflammatory conditions, it is to be noted that they may be administered either alone or in combination with a pharmaceutically acceptable carrier, and that such administration can be in single or multiple doses. More particularly, this compound may be administered in suitable dosage forms providing a unit dose of the essential active ingredient in an amount that is preferably at least about 0.1 mg. per dosage unit, although concentration levels in the aforesaid range of from about 0.1 mg. to about 10 mg. per dosage unit per day may be employed to advantage; for instance, dosage forms containing as high as 10 mg. of the active ingredient per dosage unit have been found to be particularly useful in combatting the painful effects caused by rheumatoid arthritis in extremely severe cases. When larger doses of this therapeutic agent are used, it is preferable to administer two or more unit doses at various time intervals, adjusting, if necessary, the content of the therapeutic agent per unit dosage form accordingly. For instance, multiple dosage treatment had indicated the feasibility, in some situations, of administering the hydroxyglycyrrhetic acid-containing composition at periodic intervals, e.g., topical administration of these compounds to afflicted subjects at a dosage level in the range of approximately 7.5–750 mg. per day divided into about one to about five doses has been found to be most satisfactory. Moreover, optimum results have often been obtained in such cases by administering a higher dose initially, followed by the administration of a maintenance dose of therapy at a lower dosage level, e.g., 250 mg. the first day, 100 mg. the second day, 50 mg. the third day, and 25 mg. per day thereafter.

It is apparent from the foregoing that the therapeutically-active compound of this invention can be administered in a variety of topical dosage forms, i.e., it may be combined with various pharmaceutically acceptable inert carriers in the form of creams, jellies, lotions, ointments, powders, salves, and the like. In general, the triterpenoid of this invention is present in such oral dosage forms at concentration levels ranging from about 0.020% to about 90% by weight of the total composition, i.e., in amounts generally considered to be sufficient for providing the desired unit dosage previously indicated.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

Slant washings taken from a cluture of a microorganism isolated from the soil and designated as *Curvularia lunata* ATCC 13,432 (isolate identified in our culture collection under the Code No. 1464-257G$_1$) were inoculated into a sterile nutrient medium having the following composition:

| | Grams |
|---|---|
| Soybean meal | 33 |
| Potassium dihydrogen phosphate | 1.43 |
| Tap water in sufficient volume for a 1000 ml. solution. | |

The above inoculated medium was then incubated at 28° C. for 48 hours via a rotary shaker so as to form a suitable pregrown inoculum for purposes of seeding a two liter portion of the above described medium contained in a 4-liter fermenting vessel. The fermentation medium had previously been autoclaved at 122° C./20 lbs. per sq. in. for 60 minutes. After cooling the sterilized medium to room temperature, 5% of the pregrown inoculum prepared as described above was introduced into the medium. The fermentation was then conducted at 28° C. for 24 hours, employing an aeration rate of one-half volume of air per volume of medium per minute and maintaining a constant agitation rate of 1700 r.p.m.

After completion of the 24 hour growth period, the heavy mycelium so obtained was removed by passing the whole broth through a filter consisting of glass wool and gauze. The isolated mycelium (12.5 g. on a dry weight basis) was then suspended in two liters of tap water contained in a fermentation vessel. To this mixture there was then added 250 mg. of glycyrrhetic acid dissolved in a minimum amount of acetone-ethanol (1:1 by volume) with constant agitation being maintained throughout the addition. The fermentation was then continued under the same conditions as previously described for a period of approximately 12-24 hours. The pH of the whole broth was then adjusted to 2.0 with hydrochloric acid and subsequently extracted three times with an equal volume of chloroform. The combined chloroform extracts were then concentrated under reduced pressure and subjected to chromatographic assay in the usual manner. It was found that no substrate could be detected as being present, while a scanner-positive polar product was indicated.

Partial separation of the desired material was then effected by chromatographing the chloroform extract on a silica gel column, which was subsequently eluted with various solutions of ethanol in methylene chloride, e.g., by starting with a solution consisting of three volumes of ethanol and 97 volumes of methylene chloride and then successively employing solutions having a higher percentage of ethanol in methylene chloride, the more polar substance was eluted. Those fractions which gave similar spots were then combined and subsequently evaporated to dryness under reduced pressure. The crude crystalline material so isolated was then redissolved in chloroform and the resulting solution was extracted with 5% aqueous sodium bicarbonate. The aqueous extract so obtained was then adjusted to pH 2.0 with hydrochloric acid and subsequently twice extracted with an equal volume of chloroform. The scanner positive product was then recovered from the combined chloroform extracts by means of evaporation under reduced pressure until crystallization occurred. After recrystallization from ethyl acetate, the monohydroxylated derivative of glycyrrhetic acid was found to possess the following characteristic properties: M.P. 299–307° C. (decomp.); $[\alpha]_D^{25}$ +76° (dioxane) and +140° (pyridine);

$\lambda_{max.}^{EtOH}$ at 247–248 m$\mu$

*Analysis.*—Calcd. for C$_{30}$H$_{46}$O$_5$: C, 74.03; H, 9.52. Found: C, 73.12; H, 9.16.

*Example II*

The same procedure as described in Example I was followed except that the glycyrrhetic substrate was initially present in the fermentation medium. The results obtained in this case were substantially the same as those reported in Example I.

*Example III*

A culture of a microorganism obtained from the culture collection of the U.S. Army Quartermaster Corps at Philadelphia and designated by them as *Aspergillus nidulans* QM 25b has now been established in our laboratory as belonging to the *A. unguis* species. A living culture of this organism has now been deposited in the American Type Culture Collection at Washington, D.C., as *Aspergillus unguis* ATCC 13,431 (isolate identified in our culture collection under the Code No. 961-35K). Slant washings taken from this culture were inoculated into a sterile nutrient medium having the following composition:

| | Grams |
|---|---|
| Cerelose | 30.0 |
| Malt extract | 5.0 |
| Sodium nitrate | 2.0 |
| Potassium dihydrogen phosphate | 1.0 |
| Potassium chloride | 0.5 |
| Magnesium sulfate heptahydrate | 0.5 |
| Ferrous sulfate heptahydrate | 0.01 |
| Tap water is sufficient volume for a 1000 ml. solution | |

The above inoculated media was first adjusted to a pH of 6.7 and then incubated in the same manner as described in the procedure of Example I for purposes of seeding a two-liter portion of the following fermentation medium contained in a 4-l. fermentor:

| | Grams |
|---|---|
| Corn steep liquor | 60.0 |
| Corn meal | 12.0 |
| Cerelose | 10.0 |
| Lactose | 20.0 |
| Sodium sulfate | 1.0 |
| Tap water in sufficient volume for a 1000 ml. solution | |

At this point, 5.5 g. of calcium carbonate and 2.0 ml. of soybean oil were added to the above mixture, which was then sterilized, inoculated and cultivated under the same conditions as described in the procedure of Example I corresponding to this step.

After completion of the 24 hour growth period, the resulting whole broth was diluted with tap water, employing three parts by volume of water to one part by volume of broth. To this mixture there was then added glycyrrhetic acid in the ratio of 250 mg. per liter of diluted broth dissolved in a minimum amount of acetone-ethanol (1:1 by volume). The fermentation was then continued under the same conditions as described in Example I for a period of approximately 20 hours. Isolation of the desired material was then carried out in accordance with the procedure of the first example, and the monohydroxylated derivative of glycyrrhetic acid so obtained proved to be identical in every respect with the product reported in Example I as regards the following characteristic properties: M.P. 299–307° C. (decomp.); $[\alpha]_D^{25}$ +74° (dioxane);

$\lambda_{max.}^{EtOH}$ at 247–248 m$\mu$

*Analysis.*—Calcd. for C$_{30}$H$_{46}$O$_5$: C, 74.03; H, 9.52. Found: C, 74.26; H, 9.76.

*Example IV*

The same procedure as described in Example III was followed except that the glycyrrhetic substrate was ini-

What is claimed is:

1. A process for the microbiological hydroxylation of glycyrrhetic acid, which comprises subjecting glycyrrhetic acid to the oxygenating activity of a microorganism chosen from the group consisting of *Curvularia lunata* and *Aspergillus unguis*.

2. A process as claimed in claim 1 wherein the glycyrrhetic acid is subjected to the action of oxidizing enzymes of the microorganism.

3. A process as claimed in claim 1 wherein the glycyrrhetic acid is subjected to the action of a growing culture of the microorganism.

4. The process as claimed in claim 1 wherein the microorganism is cultivated in an aqueous nutrient medium under submerged aerobic conditions until substantial growth is obtained, and the glycyrrhetic acid is then added to the fermentation mixture.

5. A process as claimed in claim 1 wherein the microorganism employed is *Curvularia lunata* ATCC 13432.

6. A process as claimed in claim 1 wherein the microorganism employed is *Aspergillus unguis* ATCC 13431.

7. A process for the hydroxylation of glycyrrhetic acid, which comprises cultivating a microorganism chosen from the species group consisting of *Curvularia lunata* and *Aspergillus unguis* in an aqueous nutrient medium under submerged aerobic conditions in the presence of glycyrrhetic acid at a temperature that is in the range of from about 20° C. to about 35° C. for a period of about one to about four days.

8. A process as claimed in claim 7 wherein the hydroxylated substance so produced is recovered from the fermentation broth.

9. Hydroxylated glycyrrhetic acid, a substance useful for alleviating anti-inflammatory conditions and for treating rheumatoid arthritis in addition to exhibiting utility as a surface-active agent, which is moderately soluble in glacial acetic acid, methanol, ethanol, methylene chloride, chloroform, ethylene dichloride, acetone, dioxane, ethyl acetate and pyridine, but only slightly soluble in dilute aqueous alkali and dilute aqueous bicarbonate, and practically insoluble in water and petroleum ether, and which melts with decomposition at 299–307° C., said substance containing the elements carbon, hydrogen and oxygen in substantially the following proportions by weight:

Carbon _____ 74
Hydrogen _____ 10
Oxygen (by difference) _____ 16 and which when dissolved in ethanol exhibits a peak of maximum absorption in the ultraviolet region of the spectrum at 247–248 mμ and which when dissolved in dioxane (C., 1%) has the optical rotation $[\alpha]_D^{25°}$ +75°±1 and which when dissolved in pyridine (C., 1%) has the optical rotation $[\alpha]_D^{25°}$ +140°.

10. A pharmaceutical composition comprising a compound as claimed in claim 9 and a pharmaceutically acceptable carrier.

No references cited.